Jan. 24, 1928.
L. F. NORDLING
1,656,986
SPRING WHEEL
Filed Feb. 10, 1926
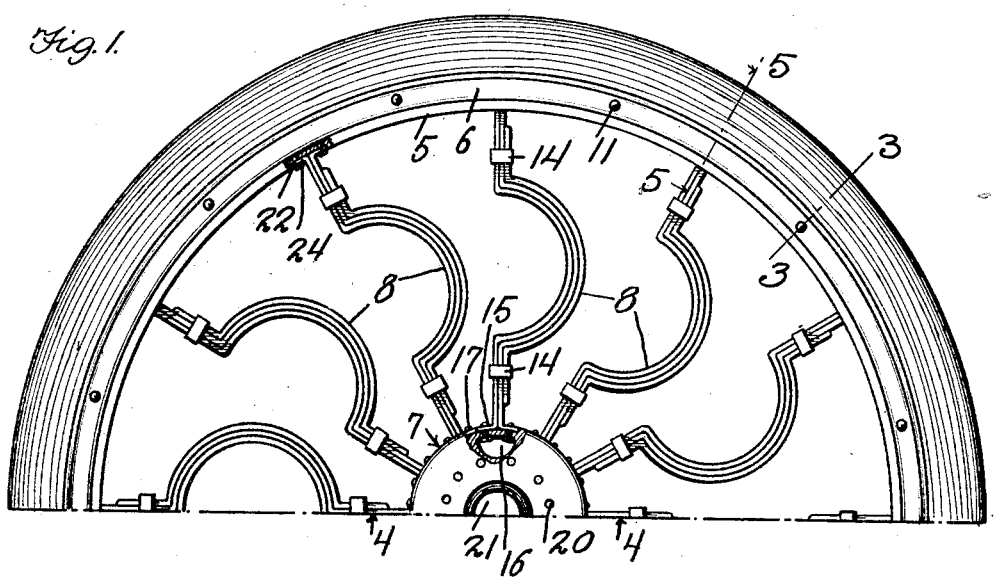
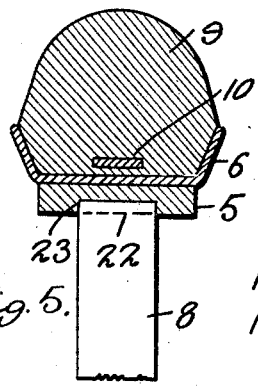
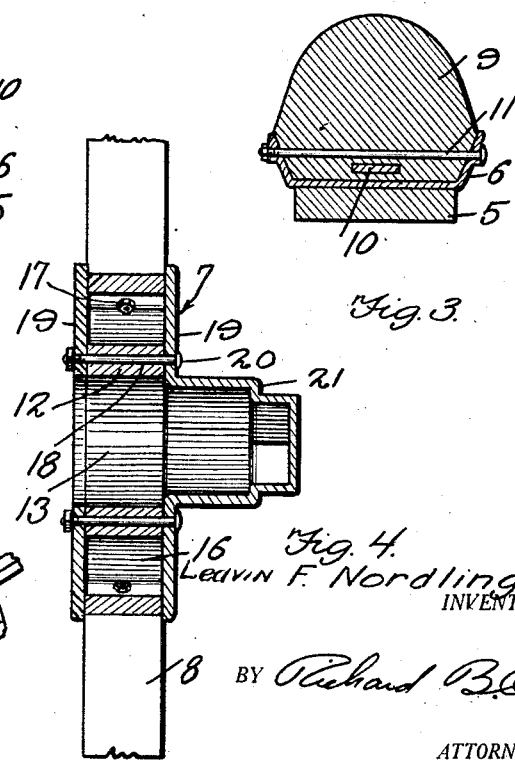
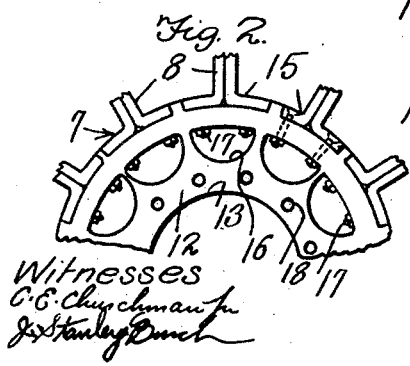
Leavin F. Nordling, INVENTOR.
Witnesses
C. C. Churchman Jr.
J. Stanley Bunch
BY Richard B. Owen
ATTORNEY.

Patented Jan. 24, 1928.

1,656,986

UNITED STATES PATENT OFFICE.

LEDVIN F. NORDLING, OF OSLO, MINNESOTA.

SPRING WHEEL.

Application filed February 10, 1926. Serial No. 87,380.

This invention relates to certain new and useful improvements in spring wheels, and has more particular reference to an improved wheel of this kind adapted especially for use upon motor vehicles to enable the employment of solid cushion tires and thereby avoid the use and disadvantages of pneumatic tires.

The present invention relates specifically to spring wheels of the curved spring spoke type, and the primary object of the invention is to provide a spring wheel of this kind which is extremely simple and durable in construction as well as efficient in operation.

A further object of the invention is to provide a spring wheel which may be readily assembled or taken apart.

Other objects will appear as the nature of the invention is better understood, and the same consists in the novel form, combination and arrangement of parts hereinafter more fully described, shown in the accompanying drawing and claimed.

In the drawing, wherein like reference characters indicate corresponding parts throughout the several views, Figure 1 is a fragmentary side elevational view, partly broken away and in section, of a spring wheel constructed in accordance with the present invention;

Figure 2 is an enlarged fragmentary elevational view of the hub portion of the wheel shown in Figure 1 with one of the side hub plates removed;

Figure 3 is a radial section taken substantially upon line 3—3 of Figure 1;

Figure 4 is a fragmentary transverse section taken substantially upon line 4—4 of Figure 1, and drawn on a larger scale to clearly show details of construction of the hub portion of the wheel shown in Figure 1 and the manner of attaching the spring spokes thereto; and Figure 5 is a view similar to Figure 3 taken substantially upon line 5—5 of Figure 1.

Referring more in detail to the drawing, the present wheel embodies an annular rigid felly band 5 adapted to have a solid-tire carrying-rim 6 snugly fitted and suitably secured thereon, and resiliently connected to a central hub 7, so as to be normally disposed in spaced concentric relation thereto, by means of a plurality of radially extending curved spring spokes 8.

As shown, the rim 6 is of integral construction and of channel form in cross section, and a solid cushion or rubber tire 9 is fitted therein with its tread portion projecting outwardly for engagement with the ground. The tire 9 has a circumferentially extending metallic band 10 embedded in the base portion thereof, midway between the sides of the same as clearly shown in Figures 3 and 5, and bolts 11 extend transversely through the base of the tire at suitable intervals as well as through the side flanges of the rim 6 and adjacent to but outwardly of the band 10 whereby the tire is effectively held in place. Obviously, by removing the nuts from the bolts 11 and then removing the latter, the tire 9 may be removed for renewal purposes when found necessary.

The hub 7 embodies a solid and relatively thick metallic disk 12 having a central opening 13 adapted to accommodate an axle bearing.

The spring spokes 8 are in the nature of leaf springs composed of a plurality of leaves suitably held together near their ends by means of clips 14, and each spring spoke embodies an arcuate intermediate portion and radial aligned oppositely projecting end portions extending from the ends of the intermediate portion as shown clearly in Figure 1. The spokes are arranged so that the intermediate portions thereof project circumferentially or in the plane of the wheel rather than laterally of the latter, and each spring comprises a pair of similar leaves whose adjacent inner ends are directed circumferentially away from each other to form apertured flanges 15 which are seated in shallow peripheral recesses provided in the disk or plate 12.

The hub disk 12 is provided with a circular series of transverse slots or openings 16 which extend from side to side thereof, and each opening 16 is disposed in alignment with the inner end of a spoke 8 so that the flanges 15 of the leaves thereof may be rigidly bolted to the disk 12 as at 17. In this way, the bolts are exposed in the openings 16 so that the nuts obviously employed therewith may be readily applied and tightened by the use of tools inserted into the openings 16.

The disk 12 is provided with a circular series of transverse apertures 18 inwardly of the openings 16, and applied to opposite sides of the spoke supporting disk 12 are side hub plates or disks 19 which are firmly clamped in place by means of bolts 20 passing therethrough and through the apertures 18 of the disk 12. The side hub plates 19 are of the well known general form employed in other hub constructions and therefore have the usual central openings for permitting the insertion of a vehicle axle and bearing. The side hub plates 19 are further of the same diameter as the disk 12 so that marginal portions thereof engage the sides of the spoke flanges 15 so as to assist the bolts 17 in rigidly fastening the spokes in place against lateral displacement relative to the disk 12. These hub plates 19 further act as closures for the openings 16 to exclude dirt, dust, and other objectionable foreign matter. As shown, one of the hub plates 19 may be provided with a suitable hub cap portion 21, either of the integral form shown, or otherwise.

As shown clearly in Figures 1 and 5, the pair of leaves of each spring which are attached to the disk 12, are also directed apart, circumferentially at their outer ends to provide flanges 22 which are counter-sunk in recesses 23 formed in the inner surface of the felly band 5 and rigidly bolted to the latter as at 24. The bolts which extend through the felly band 5 for attaching the spring spokes thereto preferably extend entirely through the felly band and are placed before the tire carrying rim 6 is mounted on the felly band.

From the above, it is apparent that upon removing one of the side hub plates 19 access may be had to the nuts on the bolts which clamp the inner ends of the spokes to the hub disk 12, whereby such nuts may be tightened, should the same become loose, and whereby the spring spokes may be detached for repair or renewal should they become damaged or broken.

In operation, the spring spokes will flex when placed under load or subjected to shock so that the desired shock absorbing qualities are obtained in conjunction with the solid cushion tire 9.

From the above description it is believed that the construction and operation as well as the advantages of the present invention will be readily understood and appreciated by those skilled in the art.

Minor changes may be made without departing from the spirit and scope of the invention as claimed.

What I claim as new is:—

1. A spring wheel comprising a hub disk provided with a circular series of transverse openings, a felly band surrounding and spaced from the hub disk, radial curved spring spokes resiliently connecting the hub disk and the felly band and normally maintaining them in concentric relation, and bolts securing the inner ends of the spokes to the hub disk and having nuts threaded thereon within said openings of the hub disk.

2. A spring wheel comprising a hub disk provided with a circular series of transverse openings, a felly band surrounding and spaced from the hub disk, radial curved spring spokes resiliently connecting the hub disk and the felly band and normally maintaining them in concentric relation, and bolts securing the inner ends of the spokes to the hub disk and having nuts threaded thereon within said openings of the hub disk, said spokes embodying pairs of leaves flanged at their ends and counter-sunk in the periphery of the hub disk and the inner surface of the felly band.

3. A spring wheel comprising a hub disk provided with a circular series of transverse openings, a felly band surrounding and spaced from the hub disk, radial curved spring spokes resiliently connecting the hub disk and the felly band and normally maintaining them in concentric relation, bolts securing the inner ends of the spokes to the hub disk and having nuts threaded thereon within said openings of the hub disk, said spokes embodying pairs of leaves flanged at their ends and countersunk in the periphery of the hub disk and the inner surface of the felly band, and hub plates bolted against opposite sides of the hub disk with marginal portions of the same engaging the sides of the flanges on the inner ends of the spokes.

4. In a spring wheel, a felly band, a hub disk disposed within and spaced from the felly band and provided with transverse openings, curved spring spokes connecting the felly band to the hub disk and having flanged inner ends, and bolts securing the inner ends of the spokes to the hub disk and having nuts threaded thereon within the openings of said hub disk.

In testimony whereof I affix my signature.

LEDVIN F. NORDLING.